United States Patent Office 3,378,708
Patented Apr. 16, 1968

3,378,708
ALTERNATORS
Alfred Dickens Baker, Solihull, England, assignor to Joseph Lucas (Industries) Limited, Solihull, England
Filed Apr. 12, 1965, Ser. No. 447,275
Claims priority, application Great Britain, Apr. 28, 1964, 17,502/64
1 Claim. (Cl. 310—68)

ABSTRACT OF THE DISCLOSURE

An alternator includes a casing, a rotor mounted for rotation in the casing and carrying a field coil, brushes through which the field coil is energised, a stator surrounding the rotor and having windings from which the alternator output is obtained, and a voltage regulator controlling curent flow to the field winding. The brushes are carried by an insulating member which is formed with recesses within which components of the voltage regulator are located.

This invention relates to alternators, more particularly for use in road vehicles, of the kind comprising a casing, a rotor mounted for rotation within the casing and carrying a field coil, brushes through which the field winding is energised, a stator surrounding the rotor and having windings from which the alternator output is obtained through a full wave rectifier, and a voltage regulator controlling current flow to the field winding.

According to the invention, an alternator of the kind specified includes an insulating member secured to the alternator and carrying the brushes, the insulating member being formed with recesses in which components of the voltage regulator are located.

Figure 1:
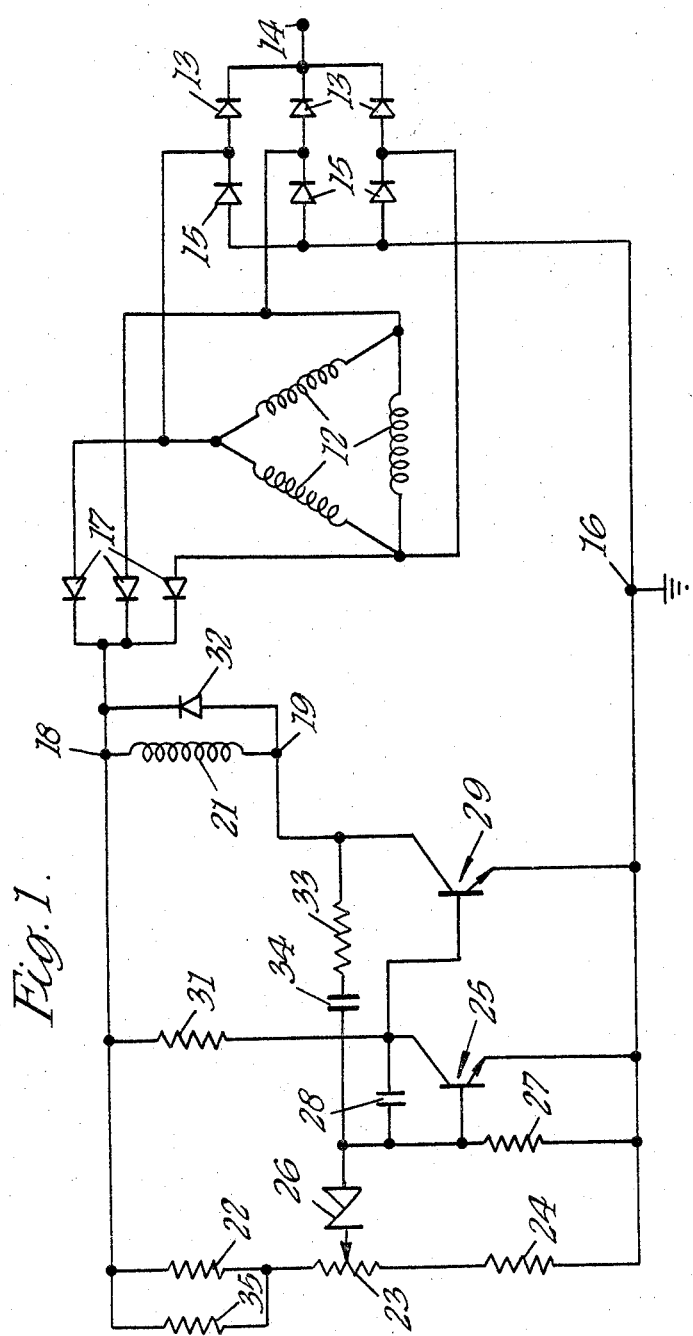
Figure 2:
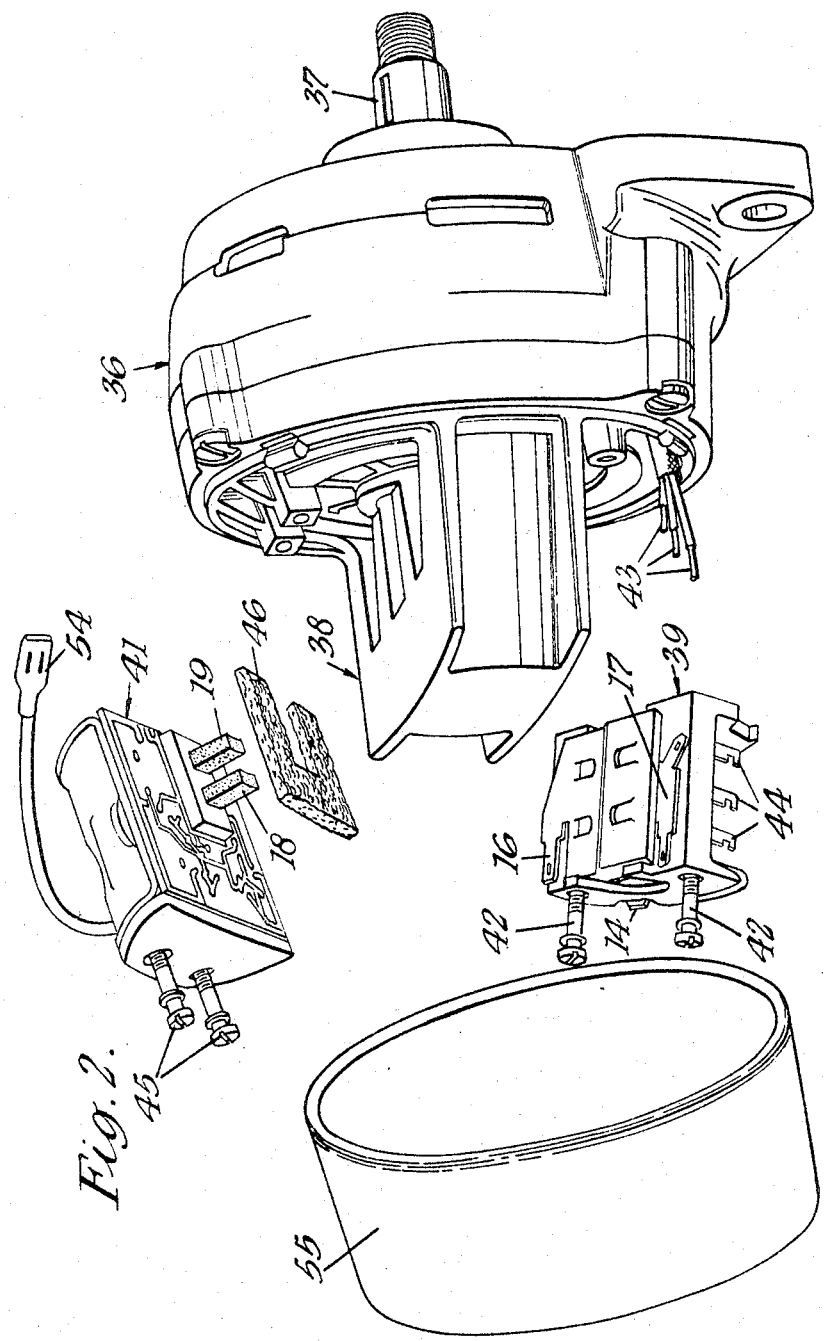
Figure 3:
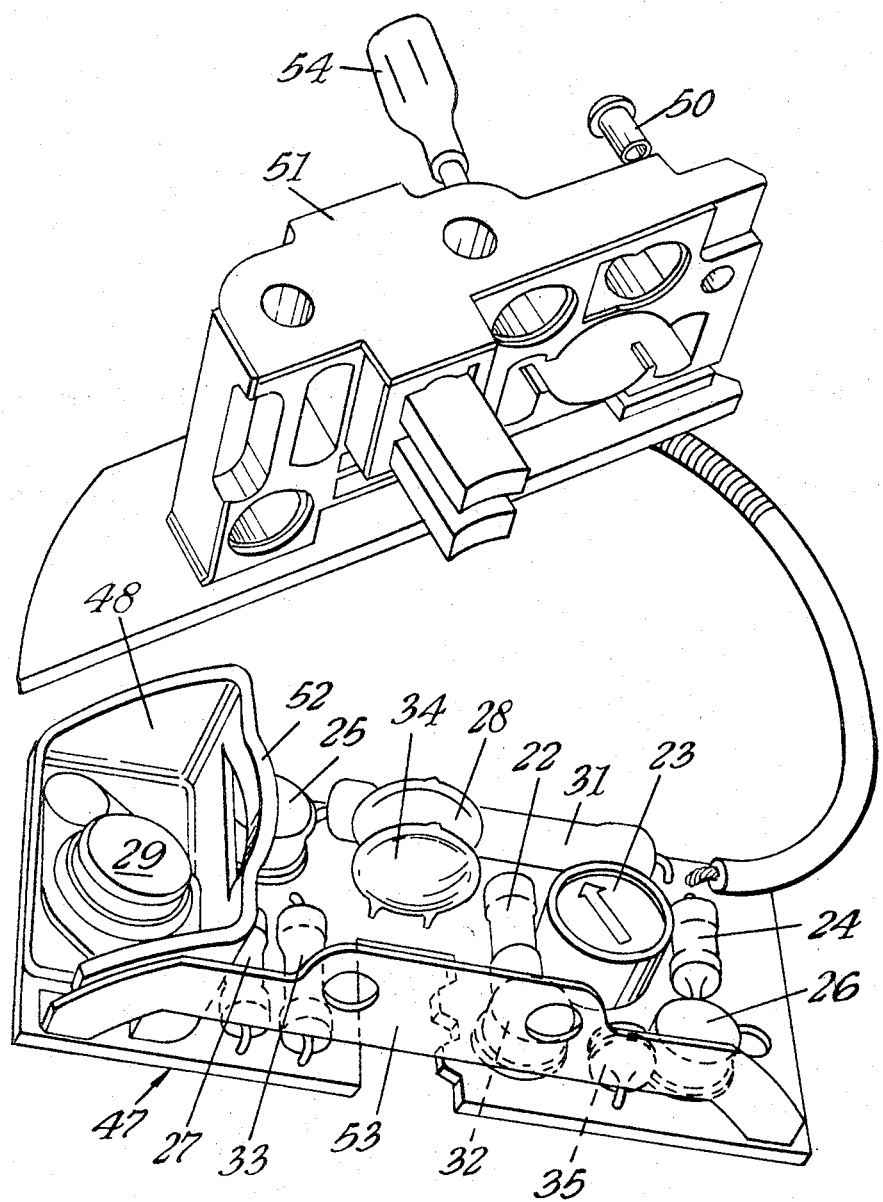

In the accompanying drawings, FIGURE 1 is a circuit diagram illustrating the electrical connections of an alternator, rectifier and regulator according to one example of the invention, FIGURE 2 is an exploded perspective view ilustrating the connection of the rectifier and regulator to the alternator casing, and FIGURE 3 is an exploded perspective view of the regulator.

Referring first to FIGURE 1, the alternator includes three delta connected stator windings 12 the phase points of which are connected respectively to the anodes of three diodes 13 having a common cathode connection to the valve alternator output terminal 14, and are also connected respectively to the cathodes of three diodes 15 having a common anode connection to the earthed alternator output terminal 16. The phase points are further connected through the anodes and cathodes of three diodes 17 to a brush 18 which, together with a brush 19, provides a path through which current is supplied by way of the slip rings to the field winding 21 of the alternator under the control of a voltage regulator.

The voltage regulator includes three resistors 22, 23, 24 connected between the terminals 18, 16, a variable point on the resistor 23 being connected to the base of a transistor 25 through a Zener diode 26. The transistor 25 has its base connected to terminal 16 through a resistor 27, its emitter connected to terminal 16, its base and collector interconnected through a capacitor 28, and its collector connected to the base of a power transistor 29 and, through a resistor 31, to the terminal 18. The brushes 18, 19 are bridged by a diode 32 which is connected in the voltage regulator and the transistor 29 has its emitter connected to the terminal 16, and its collector connected to the brush 19 and, through a resistor 33 and capacitor 34 in series, to the base of the transistor 25.

The operation of FIGURE 1 is as follows: the alternator output is rectified by diodes 13, 15 and applied between terminals 14, 16 to which the vehicle battery is connected. Also, the alternator output voltage is applied between the brush 18 and terminal 16, and as long as this voltage is below a set value transistor 29 conducts and current flows in winding 21. When the set value is exceeded, Zener diode 26 conducts and provides base current to transistor 25, which conducts and removes the base current from transistor 29. By virtue of the feedback path 33, 34, the transistors 25, 29 oscillate to provide pulsed current to winding 21 at a mark-space ratio determined by the current flow through the Zener diode 26. The capacitor 28 minimises radio interference. Preferably, a thermistor 35 is connected across resistor 22 to compensate for temperature changes.

Referring now to FIGURE 2, the alternator includes a casing 36 which carries the stator and its associated windings 12, and supports a rotatable shaft 37 on which is mounted an imbricated rotor carrying the field winding 21. At one end the casing carries an axially extending support member 38 which carries a rectifier assembly 39 and a voltage regulator assembly 41. The assembly 39 is secured to the casing by screw-threaded bolts 42, and carries the diodes 13, 15, 17 together with the required connections between the diodes. As can be seen in FIGURE 2, the stator connections 43 from the windings 12 are made to three connectors 44 on the assembly 39, which also carries the terminal 14, the earthed output terminal 16 and a terminal piece 17 which is connected to the voltage regulator (i.e. the connection from the cathodes of diodes 17) and also to warning lamp circuit not shown in FIGURE 1.

The assembly 41 is secured to the casing 36 by screw-threaded bolts 45, and carries the components of the voltage regulator plus the diode 32 and the brushes 18, 19, which are spring-loaded into contact with slip rings on the shaft 37. The brushes are protected from ingress of dust by a felt pad 46 which is sandwiched between the assembly 41 and the member 38.

The details of the assembly 41 are shown in FIGURE 3, in which there is shown a printed circuit board 47 having components of the voltage regulator mounted on one side and a printed circuit interconnecting the components in the required manner mounted on the other side. The board also carries the diode 32, which is not actually part of the carries the diode 32, which is not actually part of the regulator. It will be noted that the power transistor 29 is carried by a separate heat sink 48 carried by the board 47. Moreover, although the thermistor 35 is shown secured to the board, it could be accommodated in a position where the temperature is to be sensed, for example close to the battery of a vehicle with which the alternator is associated. In this case extra connections to the board 47 will be required.

Engaged with the board 47 is a moulded cover 51 formed with recesses shaped to receive the components on the board 47 when the cover is in position. The cover, which does not enclose the transistor 29, is engaged at one end by a catch 52 integral with the heat sink 48, and at its other end is held in position by a rivet 50. The earth connection of the voltage regulator is made by a strip 53 carried by the board 47 and connected to the printed circuit, the bolts 45 passing through the strip 53 so that the strip is held in contact with the casing 36.

The brushes 18, 19 are slidable in guide slots in the cover 51 and are outwardly spring-loaded. Within the guide slots are conductors (not shown) which when the cover 51 is engaged with the board clip under the board and make the required electrical connections to the brushes. The brushes actually slide over the conductors, but to ensure a satisfactory electrical connection the conductors are secured to terminal pieces (not shown) on the cover 51 which in turn are connected through conventional pigtail connections to the brushes.

The connector 54 is used to provide the required connection to the terminal piece 17 in FIGURE 2.

When the assemblies 39, 41 are in position, a detachable cover 55 is engaged with the casing.

In a modification (not shown) the components of the voltage regulator with the exception of the transistor 29 are located in recesses in a moulded body which is secured to the alternator casing, but the connections between the components are made by strips which clip into passages moulded in the body. The transistor 29 is once again carried by a separate heat sink which is carried by the body. In this modification, the body can be positioned below a number of hoppers and the components fed from the hoppers into the recesses. In some cases, both in the illustrated example and the modification, it may be desiratble to mount the resistor 31 on the opposite side of the board from the other components, so that the resistor 31 is not located in a recess.

Having thus described my invention what I claim as new and desire to secure by Letters Patent is:

1. An alternator having a stator and a rotor, said stator having a core and a winding, a casing for said alternator in which said stator core and winding are fixedly mounted, said casing having an end bell portion at each end thereof, each of said end bell portions having parts for rotatably supporting said rotor within said stator, a field winding carried by said rotor with slip rings connected thereto and mounted on one end of said rotor, the end bell portion of said stator supporting the slip ring end of said rotor being formed generally T-shaped with the leg of the T forming a hub extending in the form of a wall axially outwardly from the stator and having the rotor supporting part for said end therein, said hub wall extending around said slip rings, a brush holder having brushes mounted therein for contact with said slip rings, means readily detachably mounting said brush holder over one side of said hub wall on the end of said T-shaped casing end bell portion, a voltage regulator connected for controlling current flow to said field winding, a mounting assembly for said voltage regulator readily detachably mounted on said end of said T-shaped casing end bell portion over the opposite side of said hub wall from said brush holder, and an end cover detachably mounted over and enclosing said brush holder, said voltage regulator assembly, and said hub wall.

References Cited

UNITED STATES PATENTS

| | | | |
|---|---|---|---|
| 3,299,303 | 1/1967 | Newill | 322—28 |
| 3,271,601 | 9/1966 | Raver | 310—68 |
| 3,267,312 | 8/1966 | Redick | 310—68 |
| 3,077,558 | 2/1963 | Byles | 322—28 |
| 3,059,169 | 10/1962 | Raver | 322—73 |

MILTON O. HIRSHFIELD, *Primary Examiner.*

J. D. MILLER, *Assistant Examiner.*